March 2, 1948.    C. B. SPASE    2,436,874
FRICTION CLUTCH
Filed Oct. 12, 1944    2 Sheets-Sheet 1

INVENTOR:
Charles B. Spase.
BY
Bodell & Thompson
ATTORNEYS.

March 2, 1948.                     C. B. SPASE                     2,436,874
                                 FRICTION CLUTCH
                            Filed Oct. 12, 1944            2 Sheets-Sheet 2
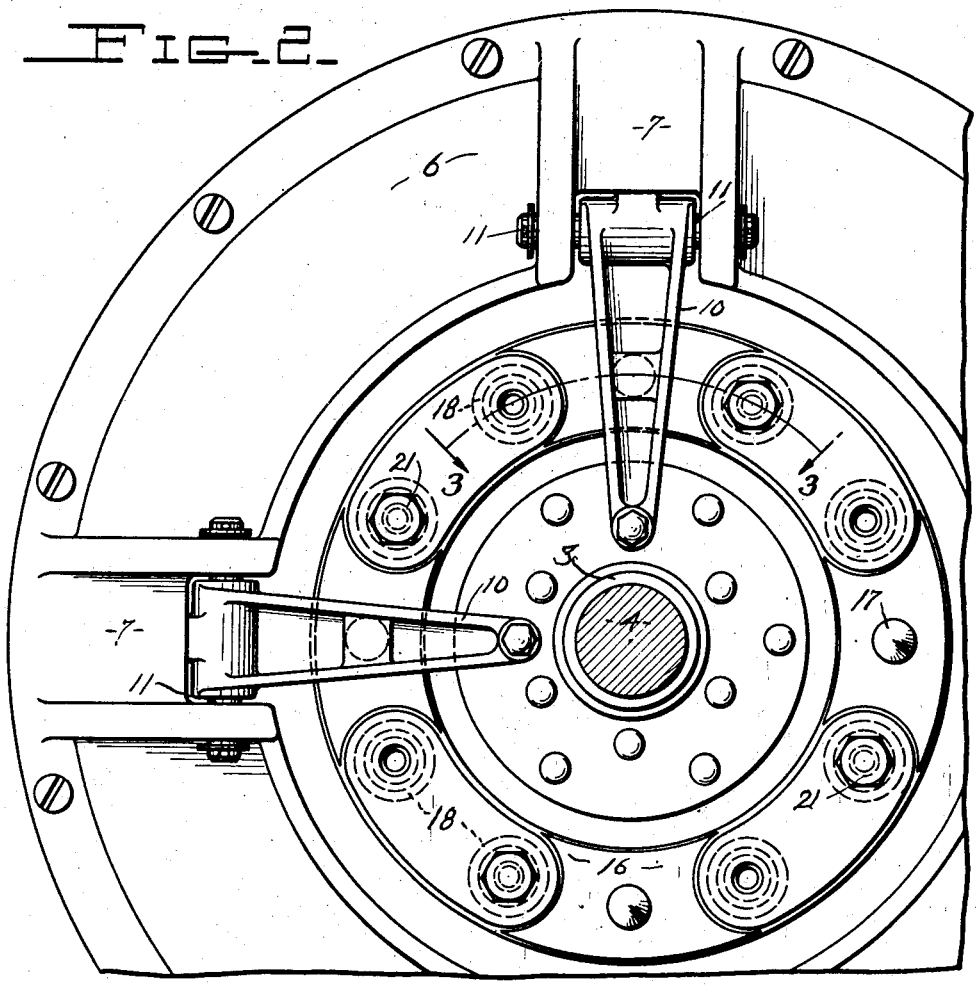
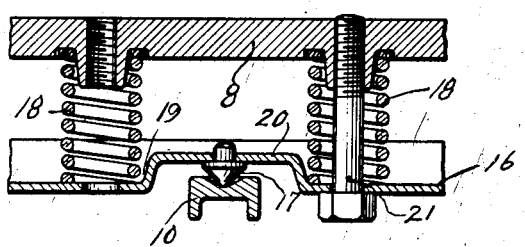
INVENTOR.
Charles B. Spase,
BY Bodell & Thompson
ATTORNEYS.

Patented Mar. 2, 1948

2,436,874

UNITED STATES PATENT OFFICE 2,436,874

FRICTION CLUTCH

Charles B. Spase, Nedrow, N. Y., assignor to Lipe-Rollway Corporation, Syracuse, N. Y., a corporation of New York Application October 12, 1944, Serial No. 558,332

7 Claims. (Cl. 192—68)

This invention relates to friction clutches of the type used in automotive vehicles and including driving and driven members, a spring-pressed pressure ring, clutch levers, and a throw-out collar, all so arranged that the clutch spring means acts in one direction directly against the pressure ring to engage the same and in the other direction through clutch leverage through the clutch levers which reverse and multiply the spring action. It has for its object a clutch in which the clutch spring means is an annular series of springs thrusting at like ends against the pressure plate and at their other ends against an abutment common to all of the springs, which abutment thrusts against the clutch levers. It further has for its object a back plate construction in which the back plate itself, the pressure ring, clutch lever mechanism and clutch springs are a unit and can be applied to and removed from the driving member as a unit.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 2 is a fragmentary rear elevation of parts seen in Figure 1.

Figure 3 is a sectional view on line 3—3, Figure 2.

Figure 1:
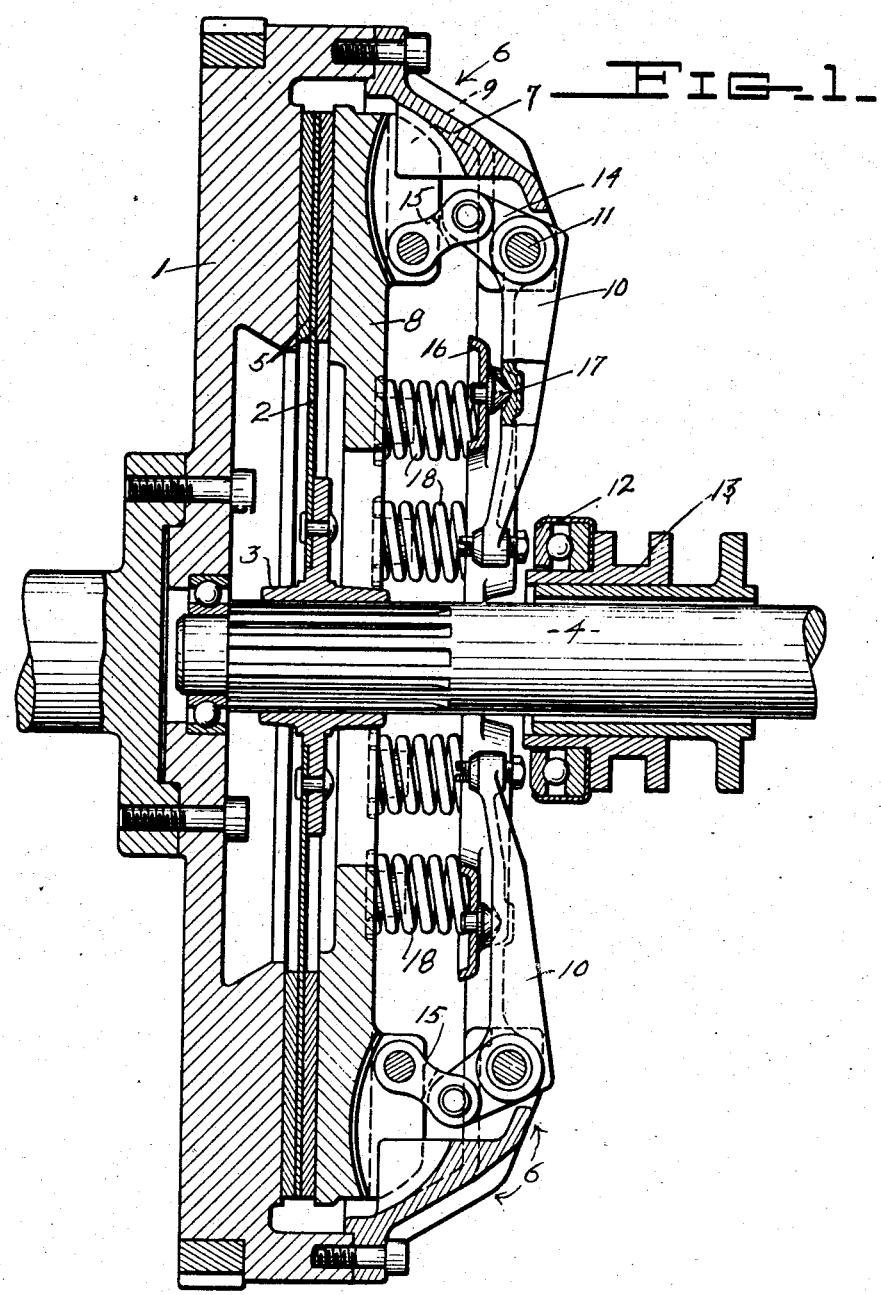
Figure 1 is a radial sectional view through a clutch embodying this invention.

The clutch here illustrated is of the disk or plate type and includes a driving member 1 which may be the flywheel of the engine of the vehicle, a driven member 2 which is a disk or a plate having a hub 3 slidably splined on the clutch shaft 4, the flywheel being formed with a recess in which the disk or plate 2 is located, this having friction faces or linings 5 on opposite sides thereof.

6 designates the back plate per se detachably secured at its rim to the driving member or flywheel 1 and provided at intervals with brackets 7 on the outer or rear side.

8 is the pressure ring, which is axially shiftable and also interlocked with the back plate at 9 to rotate therewith, and hence with the driving member 1.

10 are the clutch levers which are pivoted at 11 to the brackets 7, the levers having inwardly extending radial arms for coacting with the bearing 12 on the usual pedal operated throw-out collar 13, and also having angular arms 14 at their outer ends within the back plate, which are suitably connected to the pressure ring. In the illustrated embodiment of the invention, the angular arm 14 of each lever is one link of a toggle, the other link 15 of which is pivoted to the arm 14 and to the pressure ring or a lug thereon, the toggle being so arranged that it folds radially outward. 16 is an annular spring abutment bearing at intervals for thrusting against the levers 10 on the inwardly acting arms thereof. As here shown, bearing points 17 are provided on the abutment ring, there being one bearing point for each lever.

The clutch spring means consists of an annular series of compression springs 18 interposed between the pressure ring and the abutment 16, the springs being located on opposite sides of, or between, the levers 10. In the clutch here illustrated, there is twice the number of springs as levers, or two springs between each two levers. The abutment 16 is provided with depressions at 19 in which the outer ends of the springs seat, the formation of these depressions providing insets at 20 on which the bearing points 17 are mounted, the ends of the bearing points being in a plane substantially flush with the rear face of the abutment ring, that is, the outer faces of the depressed portions 19.

The back plate 7, pressure ring 8, levers 10, springs 18, spring abutment 16 and links 15 are thus a unitary structure separable from and applicable to the driving member or flywheel as a unit. In order to facilitate the handling of these elements as a unit, means is provided for holding the springs from reaction against the levers, the means here shown acting to clamp the abutment toward the pressure ring. This means is here illustrated as screw bolts 21 extending through holes in the abutment 16 and threading into bores in the pressure ring 8. The holes are preferably located in the ring coaxial with the springs and the threaded holes for the bolts extend axially of the bosses on the pressure ring extending axially into the springs. When the clutch is installed, these bolts are removed. They can be replaced for the purpose of removing the unit for the purpose of repairing it and for replacing it after being repaired. For convenience in manufacture, holes for the bolts are provided in line with each spring, although in actual use, it is only necessary to use in this instance three or four bolts to hold the springs loaded while the clutch elements carried by the back plate are being placed in position or removed.

The assembly of the pressure ring 8, springs 18, abutment ring 16 and levers 10, bearing points 17, which are conical, and the conical seats in the levers performs a vibration dampening function. The ring 16, in addition to being an abutment for the springs, also serves as an inertia member for dampening torsional vibrations, whatever the origin of the vibrations may be. The conical bearing points 17 are, in effect, poppets capable of riding or camming up the sides of their seats or sockets in the levers 10. The dampening operation is as follows: When torsional vibrations develop in engine or drive shaft, flywheel or driven shaft, the abutment ring not being fixed or anchored to the pressure ring 8, levers 10, back plate 7, or anything, throws circumferentially under its inertia causing the poppets or the bearing points 17 to ride or cam up the inclined sides of the conical seats in the levers 10, thus momentarily increasing the pressure on the pressure ring directly through the springs 18 and indirectly through the levers 10, and dampening the torsional shock or vibration.

What I claim is:

1. In a clutch, the combination of driving and driven members, a pressure ring rotatable with the driving member, a back plate detachably secured to the driving member, clutch mechanism including multiplying and reversing levers pivoted to the back plate and connected to the pressure ring, said levers having inwardly extending radial arms, an annular abutment thrusting against the inwardly extending radial arms tending to move said arms rearwardly about the pivots of the levers, an annular series of springs interposed between the pressure ring and the abutment and a throw-out collar thrusting during declutching operation on the inner arms of the levers in a direction opposite to the direction of the thrust of the spring against the abutment, the springs being located on opposite sides of the levers and the abutment thrusting against the levers between the springs, and means for clamping the abutment to the pressure ring to hold the springs from reaction against the levers, whereby the back plate, pressure ring, springs and levers are removable from the driving member and replaceable as a unit.

2. A self-contained back plate and clutch mechanism unit for application as a unit to a driving clutch member, comprising a back plate, a pressure ring rotatable with the back plate and axially shiftable relatively thereto, multiplying and reversing mechanism including levers pivoted to the back plate, the levers having inwardly extending radial arms for coacting with the throw-out collar of the clutch, an annular series of springs compressed between the pressure ring and the inwardly extending lever arms, and means for holding the springs compressed from reacting on the levers.

3. A self-contained back plate and clutch mechanism unit for application as a unit to a driving clutch member, comprising a back plate, a pressure ring rotatable with the back plate and axially shiftable relatively thereto, multiplying and reversing mechanism including levers pivoted to the back plate and connected to the pressure ring, the levers having inwardly extending radial arms for coacting with the throw-out collar of the clutch, an annular spring abutment bearing on the inwardly extending arms of the levers, and an annular series of springs between the pressure ring and the abutment, and means for temporarily clamping the abutment toward the pressure ring to relieve the levers of reaction of the springs.

4. In a clutch, the combination of driving and driven members, a pressure ring rotatable with the driving member, a back plate, clutch mechanism including multiplying and reversing levers pivoted to the back plate and connected to the pressure plate, said levers having inwardly extending radial arms, an annular abutment thrusting against the inwardly extending radial arms tending to move said arms rearwardly about the pivots of the levers, an annular series of springs interposed between the pressure ring and the abutment and a throw-out collar thrusting during declutching operation on the inner arms of the levers axially in a direction opposite to the direction of the thrust of the spring against the abutment, the abutment being an inertia member and having thrust bearing points on the levers coacting with the levers to have an axial camming action during shifting under momentum of the abutment relative to the levers and thus increase momentarily the loading of the springs.

5. In a clutch, the combination of driving and driven members, a pressure ring rotatable with the driving member, a back plate, clutch mechanism including multiplying and reversing levers pivoted to the back plate and connected to the pressure ring, said levers having inwardly extending radial arms, an annular abutment thrusting against the inwardly extending radial arms and coacting therewith to have a limited rocking movement relatively thereto under torque vibrations, spring means interposed between the pressure ring and the abutment and coacting therewith to permit the abutment to have a limited rocking movement relative to the pressure ring, and a throw-out collar coacting with the inner ends of the levers to thrust against the levers in a direction opposite to the direction of the thrust of the spring means against the abutment.

6. In a clutch, the combination of driving and driven members, a pressure ring rotatable with the driving member, a back plate, clutch mechanism including multiplying and reversing levers pivoted to the back plate and connected to the pressure ring, said levers having inwardly extending radial arms, an annular abutment thrusting against the inwardly extending radial arms and coacting therewith to have a limited rocking movement relatively thereto under torque vibrations, clutch engaging spring means acting on the abutment to actuate the levers to engage the clutch and coacting with the abutment to permit the abutment to have a limited rocking movement relatively to the pressure ring, and a throw-out collar coacting with the inner ends of the levers to thrust against the levers in a direction opposite to that of the thrust of the spring means against the abutment.

7. In a clutch, the combination of driving and driven members, a pressure ring rotatable with the driving member, a back plate, clutch mechanism including multiplying and reversing levers pivoted to the back plate and connected to the pressure ring, said levers having inwardly extending radial arms, an annular abutment thrusting against the inwardly extending radial arms and coacting therewith to have a limited rocking movement relatively thereto under torque vibrations, clutch engaging spring means acting on the abutment to actuate the levers to engage the clutch and coacting with the abutment to permit the abutment to have a limited rocking movement relatively to the pressure ring, and a throw-out collar coacting with the inner ends of the levers to thrust against the levers in a direction opposite to that of the thrust of the spring means against the abutment, and cam parts on the abutment, and the inwardly extending radial arms of the levers coacting with a cam action against the action of the springs on the abutment, during the rocking movement of the abutment.

CHARLES B. SPASE.

REFERENCES CITED

The following references are of record in the file of this patent:

UNITED STATES PATENTS

| Number | Name | Date |
| --- | --- | --- |
| 2,058,863 | Goodwin | Oct. 27, 1936 |
| 2,081,824 | Lambert | May 25, 1937 |
| 2,138,129 | Wolfram | Nov. 29, 1938 |
| 2,146,044 | Wolfram | Feb. 7, 1939 |
| 2,204,879 | Batten et al. | June 18, 1940 |
| 2,230,520 | Wemp | Feb. 4, 1941 |
| 2,296,957 | Spase | Sept. 29, 1942 |
| 2,349,996 | Spase | May 30, 1944 |